Nov. 6, 1962 C. H. COGGIN 3,061,906
APPARATUS AND PROCESS FOR STABILIZING INDUSTRIAL FABRICS
Filed Oct. 1, 1957 14 Sheets-Sheet 1

CHARLES H. COGGIN.
INVENTOR

Pennie Edmunds,
Morton, Barrows
a Taylor,
ATTORNEYS.

Nov. 6, 1962 C. H. COGGIN 3,061,906
APPARATUS AND PROCESS FOR STABILIZING INDUSTRIAL FABRICS
Filed Oct. 1, 1957 14 Sheets-Sheet 2

CHARLES H. COGGINS
INVENTOR

BY Pennie, Edmonds
Morton, Barrows
& Taylor
ATTORNEYS

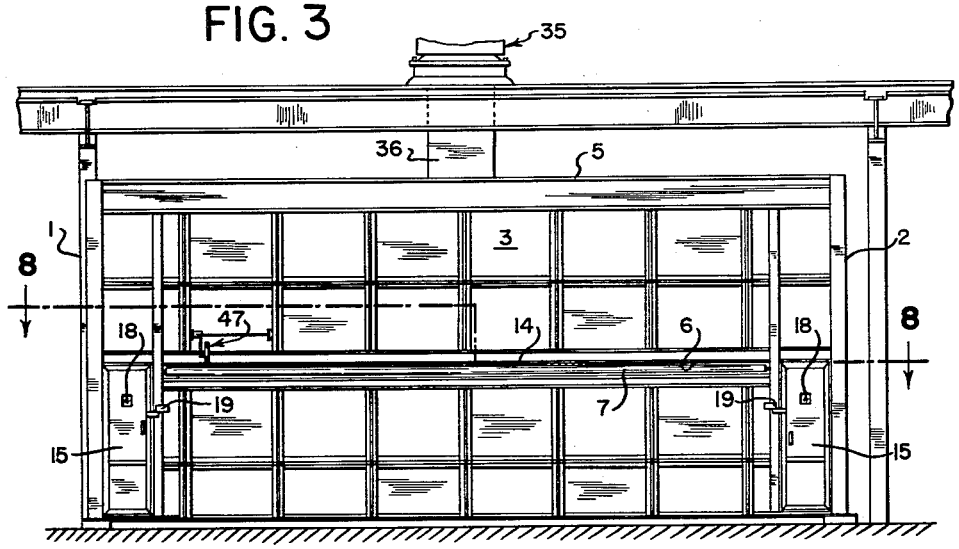
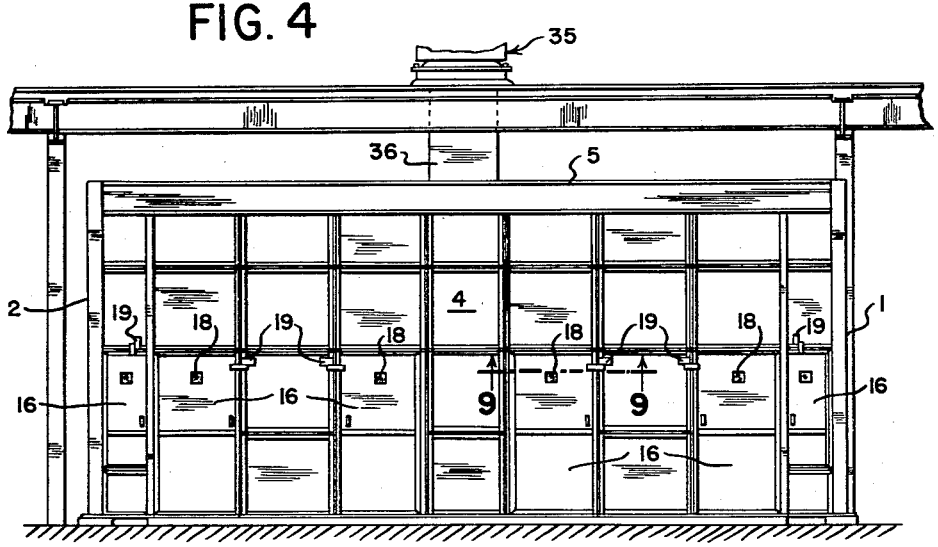

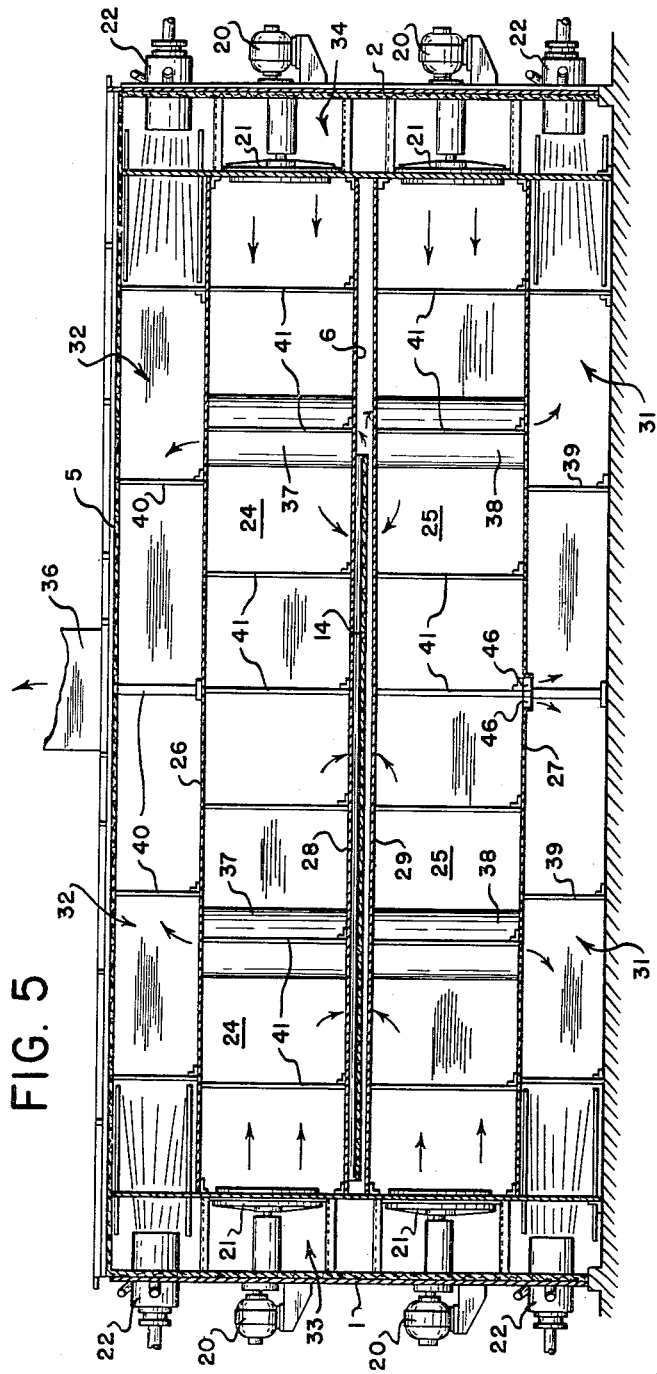
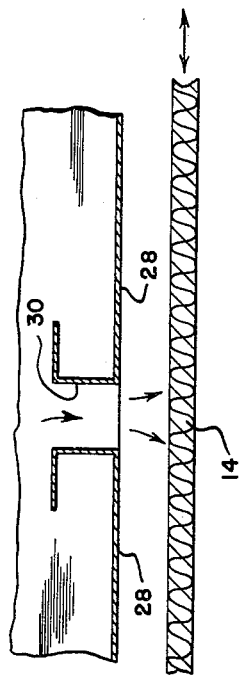
FIG. 5
FIG. 10

Nov. 6, 1962  C. H. COGGIN  3,061,906
APPARATUS AND PROCESS FOR STABILIZING INDUSTRIAL FABRICS
Filed Oct. 1, 1957  14 Sheets-Sheet 5

CHARLES H. COGGINS
INVENTOR

BY
ATTORNEYS

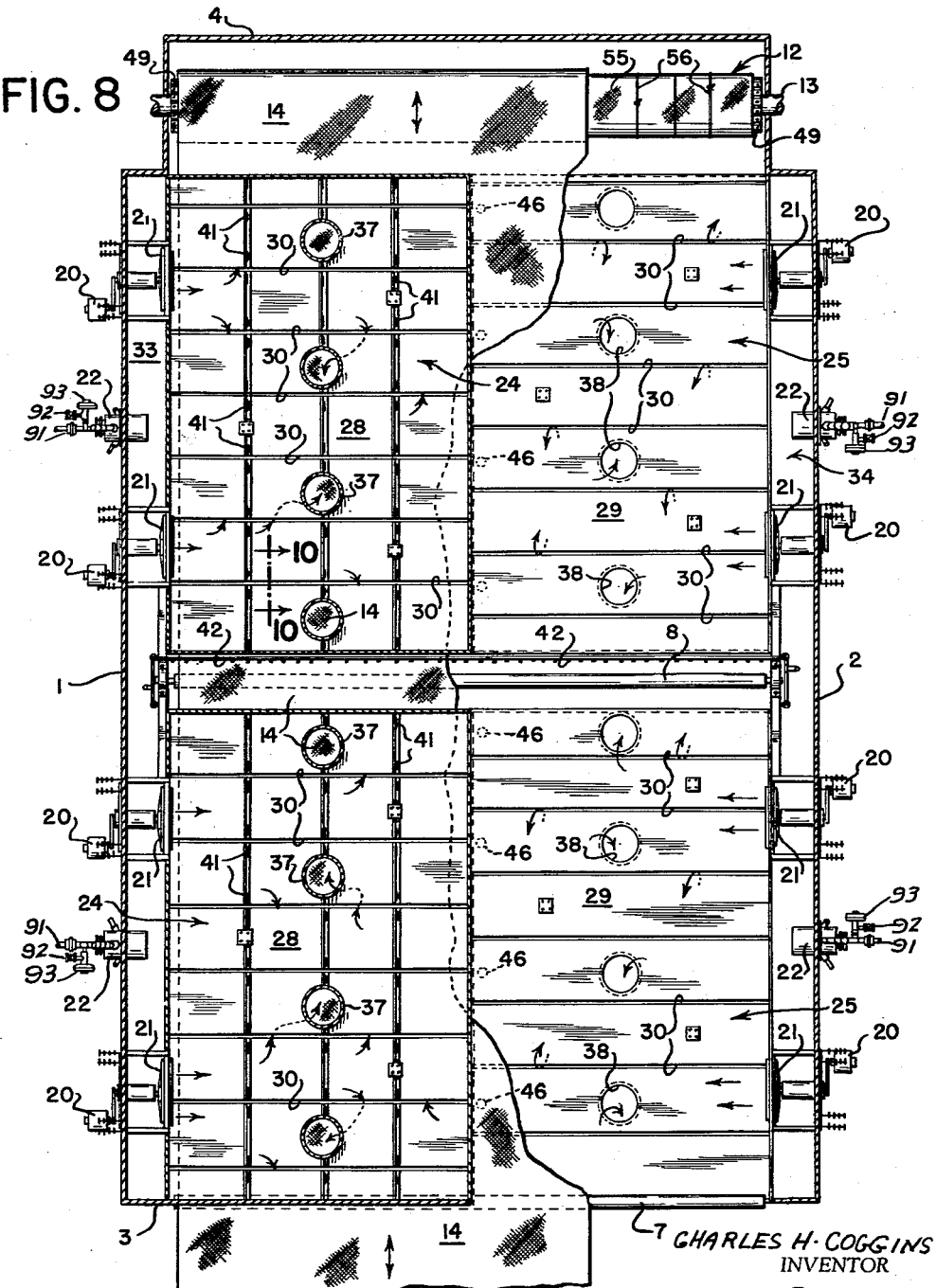

Nov. 6, 1962 C. H. COGGIN 3,061,906
APPARATUS AND PROCESS FOR STABILIZING INDUSTRIAL FABRICS
Filed Oct. 1, 1957 14 Sheets-Sheet 7

CHARLES H. COGGINS
INVENTOR

BY Pennie, Edmunds,
Morton, Barrows &
Taylor
ATTORNEYS

Nov. 6, 1962 C. H. COGGIN 3,061,906
APPARATUS AND PROCESS FOR STABILIZING INDUSTRIAL FABRICS
Filed Oct. 1, 1957 14 Sheets-Sheet 8

CHARLES H. COGGINS
INVENTOR

BY Pennie, Edmonds
Morton, Barrows
& Taylor
ATTORNEYS

Nov. 6, 1962 C. H. COGGIN 3,061,906
APPARATUS AND PROCESS FOR STABILIZING INDUSTRIAL FABRICS
Filed Oct. 1, 1957 14 Sheets-Sheet 9

CHARLES H. COGGINS
INVENTOR

BY Pennie, Edmunds,
Morton, Barrows &
Taylor

ATTORNEYS

Nov. 6, 1962  C. H. COGGIN  3,061,906
APPARATUS AND PROCESS FOR STABILIZING INDUSTRIAL FABRICS
Filed Oct. 1, 1957  14 Sheets-Sheet 10

CHARLES H COGGINS
INVENTOR

BY
ATTORNEYS

Nov. 6, 1962 C. H. COGGIN 3,061,906
APPARATUS AND PROCESS FOR STABILIZING INDUSTRIAL FABRICS
Filed Oct. 1, 1957 14 Sheets-Sheet 11

CHARLES H. COGGINS
INVENTOR

BY Pennie, Edmunds,
Morton, Barrows &
Taylor
ATTORNEYS

Nov. 6, 1962 C. H. COGGIN 3,061,906
APPARATUS AND PROCESS FOR STABILIZING INDUSTRIAL FABRICS
Filed Oct. 1, 1957 14 Sheets-Sheet 12

CHARLES H COGGINS
INVENTOR

BY Pennie, Edmonds,
Morton, Barrows &
Taylor
ATTORNEYS

Nov. 6, 1962    C. H. COGGIN    3,061,906
APPARATUS AND PROCESS FOR STABILIZING INDUSTRIAL FABRICS
Filed Oct. 1, 1957    14 Sheets-Sheet 13

CHARLES H. COGGINS
INVENTOR

Nov. 6, 1962 C. H. COGGIN 3,061,906
APPARATUS AND PROCESS FOR STABILIZING INDUSTRIAL FABRICS
Filed Oct. 1, 1957 14 Sheets-Sheet 14

CHARLES H. COGGINS
INVENTOR.

BY
ATTORNEYS

United States Patent Office 3,061,906
Patented Nov. 6, 1962

3,061,906
APPARATUS AND PROCESS FOR STABILIZING INDUSTRIAL FABRICS
Charles H. Coggin, Columbia, S.C., assignor to Mount Vernon Mills, Inc., Baltimore, Md., a corporation of Maryland
Filed Oct. 1, 1957, Ser. No. 687,460
2 Claims. (Cl. 26—68)

This invention relates to improvements in apparatus and processes for the stabilization of industrial fabrics, including heavy industrial fabrics, and more particularly dryer felts for paper machines; and includes an improved apparatus for the stabilizing of industrial fabrics and improved methods which can be carried out therein and improved stabilized fabrics produced thereby.

Industrial fabrics which can advantageously be stabilized by the apparatus and processes of the present invention include heavy single ply fabrics such as are used, for example, as conveyor or transmission fabrics or in making conveyor or transmission belting, and heavy multiply fabrics and particularly dryer felts for paper machines. The improved apparatus and process enable such industrial fabrics to be heat stabilized, and enable stabilized fabrics to be produced having dimensional stability and other advantages.

The improved apparatus and process are particularly advantageous for the stabilizing of dryer felts for paper machines.

Dryer felts for paper machines vary in width, e.g., between 6 feet and 25 feet, and also in length, e.g., from 25 to 160 yards, more or less, and are commonly made of heavy multi-layer or multiply fabric. In use on a paper machine, these dryer felts operate in a continuous manner, picking up the wet paper and passing it over hot drying cylinders where the paper is dried at temperatures ranging from around 150° F. to around 350° F. Dryer felts in use are commonly held under considerable tension.

One object of the invention is the provision of an apparatus and process for the production of stabilized dryer felts for use on a paper machine for the drying of wet materials such as paper, and which felt is stabilized against objectionable stretching or shrinkage, either longitudinally or crosswise, and against puckering or wrinkling or distortion when used on paper machine dryers.

A further object of the invention is the provision of an improved apparatus, and novel subcombinations thereof, for the drying of heavy industrial fabrics, and particularly of dryer felts, in which long lengths of fabric can be passed repeatedly and in opposite directions and for their full length through a long chamber, in which the fabric can be wet and saturated with water during one or more of said passages and in which provision is made for applying a high tension to the fabric while it is passing through said passages, and in which provision is made for heating the fabric while it is passing through the apparatus by subjecting it to the action of hot gases or products of combustion at a regulated temperature applied to both sides of the fabric to effect heating and stabilization of the fabric without local or excessive overheating of any portion of the fabric.

Another object of the invention is the provision of an improved apparatus and process in which a heavy industrial fabric such as a dryer felt can be maintained under regulated tension and passed through a heating chamber where it is subjected to heating by hot air or hot products of combustion applied repeatedly during the passage of the fabric through the apparatus to effect heat stabilization, or drying and heat stabilization, while the fabric is passing through the apparatus.

Other objects of the invention will appear from the following more detailed description.

The improved apparatus of the invention is a relatively large apparatus, having for example, over-all dimensions of around 50 feet in length, 32 feet in width, and 13 feet in height, and it is adapted for use in the stabilization of industrial fabrics of varying widths, e.g., in the case of dryer felts, from around 6 feet to 25 feet in width and of varying lengths, e.g., in the case of dryer felts, from 25 to 160 yards more or less.

The improved apparatus includes a long, wide, and relatively thin longitudinal passage through which the fabric can be passed at regulated speed from one end to the other and back again, and in which provision is made for subjecting the fabric to the action of hot air or hot products of combustion at a regulated temperature applied to both sides of the fabric to effect heating and stabilization thereof while under tension, and without local or excessive overheating of any portion of the fabric.

The apparatus is provided with rolls at its ends on which the fabric can be wound and from which it can be unwound. Each roll is provided with an apron to which the ends of the fabric can be secured, and with the aprons on each roll of a length somewhat greater than that of the length of the apparatus through which the fabric is passed, so that the entire length of the fabric can be unwound from one roll and passed through the apparatus and onto the other roll, and so that all portions of the fabric, while passing through the apparatus, can be subjected to treatment therein.

The aprons on the rolls at the ends of the apparatus are advantageously made of a number of strips of fabric extending across the length of the roll, so that industrial fabrics of different widths can be secured to the necessary number of apron strips, while the apron strips which are not used can remain wound on the rolls.

The proper stabilization of heavy industrial fabrics requires the application of high tensions to the fabric, which may amount to as much as 15,000 to 25,000 pounds or more. The improved apparatus of the present invention provides for producing the necessary tension as the fabric is unrolled from one roll at one end of the apparatus and rolled up on the other roll at the other end, with the necessary tension being applied to the roll onto which the fabric is being wound and with the necessary resistance being applied to the roll at the other end of the apparatus from which the fabric is being unwound during the process of treating it in the apparatus.

In order to enable the high tension to be applied to the rolls from which and onto which the fabric is wound or unwound during the treatment in the apparatus, these rolls are advantageously combined with reducing gears of e.g. 1 to 300, and these in turn are advantageously connected to electrical motor driven variable speed couplings which can be operated to maintain a constant speed of the roll and a constant tension of the roll onto which the dryer felt is pulled, and a corresponding resistance on the roll from which the fabric is unwound.

The apparatus provides an improved means for applying the necessary high tension during the heat treatment of the fabric in the apparatus and for heating the fabric by hot gases on both sides during the heat treatment in the apparatus, to raise it to the necessary temperature for heat stabilization.

With fabrics such as cotton dryer felts, the apparatus provides means for wetting and saturating the fabric with water by spraying it with water on both sides to thoroughly wet it as it is passing through the apparatus, so that the fabric, e.g., a cotton dryer felt, can be thoroughly saturated with water under a regulated tension before it is subjected to the heat treatment to dry it and stabilize it under a high tension.

The improved apparatus includes a number of separate compartments, some of which are above the passage through which the fabric passes and some of which are below it, and each of these chambers is provided with means for supplying and circulating hot air or hot products of combustion and for discharging them against the fabric on both sides, and for recirculating and reusing the gases with the addition of fresh products of combustion and the removal of exhaust gases from the apparatus.

The improved process of the present invention, and which can advantageously be carried out in the apparatus of the invention, is one in which industrial fabrics, and particularly heavy dryer felts, can be subjected to uniform heating while maintained under lengthwise tension by subjecting the fabric to the action of hot air or hot products of combustion at a regulated temperature applied to both sides of the fabric to effect heating and stabilization without local or excessive overheating of any portion of the fabric. This treatment of the fabric can be carried out with re-passing of the fabric through the apparatus a sufficient number of times to bring it to the necessary temperature for stabilization, while maintaining it under a regulated high tension.

In carrying out the process, the felt or other fabric is secured at each end to a sufficient number of sections of the apron on the roll at each end; and the aprons are of such a length that the entire length of the felt can be carried throughout the apparatus from one end to the other, both in a forward and reverse direction.

The tension which will be applied to the heavy fabric will vary with different fabrics and with different widths of the same fabric. Thus, in the heat treatment and stabilizing of a dryer felt weighing e.g. 59 ounces per square yard and having a width of e.g. around 25 feet, the lengthwise tension which is applied to the felt during the heat stabilizing treatment may amount to many thousand pounds.

The temperature to which the dryer felt or other heavy fabric is subjected will vary somewhat with different felts. With cotton felts, a temperature not exceeding about 350° is used to avoid injury to the cotton, and in many cases a somewhat lower temperature is advantageously used, e.g., around 300° F., and in some cases higher temperatures can be used.

With cotton felts, the process is advantageously carried out with passing of the felt through the apparatus and applying water by spraying or otherwise to effect thorough wetting or saturation of the felt during one or more passages of the felt through the apparatus and while maintaining the felt under tension. The thus preliminarily wet felt is then heated during its passage through the apparatus, by contact with the hot gases forced against and through the felt repeatedly from both sides of the felt and while maintaining the felt under high tension to effect drying and heat stabilization of the felt.

The heavy tension applied to a heavy dryer felt during the process will cause a felt, such as a cotton felt, to increase somewhat in length, e.g., up to around 10% or more in length. There will be a small decrease in width accompanying this increase in length. With such cotton dryer felts, the felt will be woven with a somewhat greater width than that desired in the final stabilized felt and may be somewhat shorter in length. The stabilizing treatment will somewhat decrease the width and increase the length to that desired in the final stabilized felt.

The improved apparatus of the present invention, with its provision for wetting the felt or other fabric during its passage through the apparatus, enables the fabric to be thoroughly saturated prior to heating and heat stabilization under tension. It also enables the felt, after heat stabilization, to be subjected to a further wetting and subsequent drying under tension, simulating that to which a felt would be subjected on a paper machine.

The process can thus be carried out by subjecting the fabric to heat stabilization without first wetting the fabric; or by first wetting the fabric before heat stabilization; or by wetting the fabric and further drying after stabilization; or with wetting of the fabric before heat stabilization and with wetting and drying of the fabric subsequent thereto. In all cases, the fabric will be held under regulated tension during the heat stabilizing treatment and during any prior wetting treatment or during any subsequent wetting and drying treatment.

The industrial fabrics which can advantageously be stabilized in the improved apparatus and by the processes of the present invention include heavy, single ply fabrics such as are used in belting or conveyors. The apparatus and process are of special advantage for the heat stabilization of dryer felts for paper machines, including dryer felts made of cotton or synthetic fibers, or mixtures of cotton and synthetic fibers, or dryer felts containing cotton-asbestos fibers, etc.

In the case of dryer felts, the fabrics may be ordinary multi-layer, multi-weave, fabrics, but are advantageously felts made with relatively straight core warp yarns located between the layers or plies of the fabric, and which serve to carry the greater portion of the tension to which the fabric is subjected during the stabilization treatment and during subsequent use as a dryer felt on the paper machine, as described, for example, in U.S. Patent No. 1,879,243.

The improved apparatus of the present invention can advantageously be used for the stabilization of polyester fiber dryer felts as described in companion application Serial No. 684,285, filed September 16, 1957.

An apparatus of the invention, and which is adapted for the carrying out of the processes of the invention, is illustrated in a somewhat conventional and diagrammatic manner in the accompanying drawings, but it will be understood that the invention is not limited thereto.

The apparatus and the process carried out therein will be more particularly described in connection with the treatment of dryer felts for paper machines, but the apparatus and process can also be applied to other heavy industrial fabrics.

In the accompanying drawings,

FIG. 3 is an end view of the apparatus from the line 3—3 of FIG. 1;

FIG. 4 is an opposite end view from the line 4—4 of FIG. 1;

FIG. 5 is a sectional elevation on the line 5—5 of FIG. 1;

FIG. 8 is a horizontal section on the broken line 8—8 of FIG. 3;

FIG. 10 is an enlarged section taken on the line 10—10 of FIG. 8;

Figure 1:
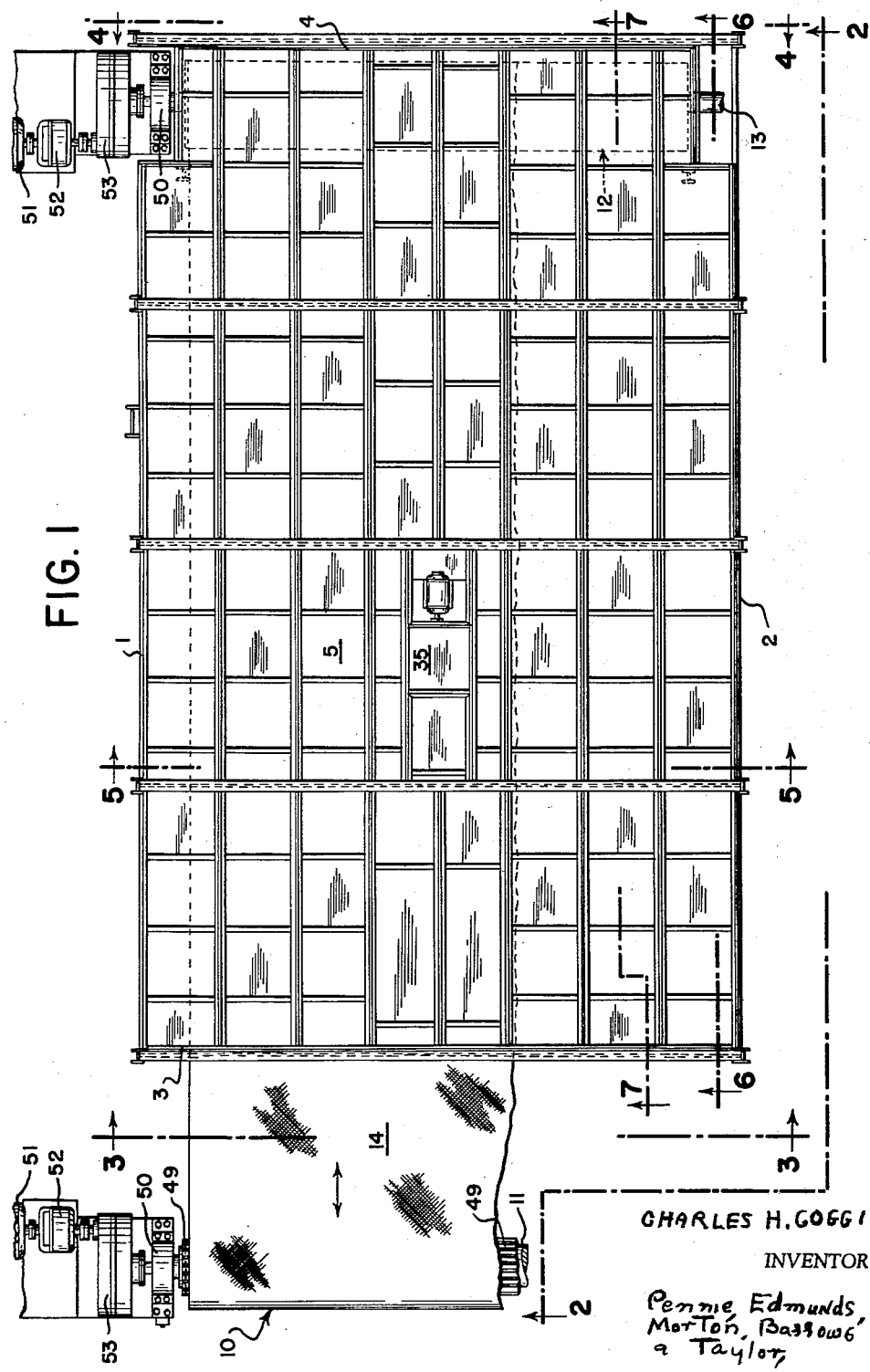
FIG. 1 is a plan view of the apparatus with parts broken away.

The apparatus illustrated is a large apparatus having over-all dimensions of around 51 feet in length, 32 feet in width, and 13 feet in height.

The sides 1 and 2 of the apparatus, the ends 3 and 4, and the top 5 are made of aluminum or other rust-proof materials with Fiberglas insulation and inner asbestos boarding, and within this apparatus is a central chamber or passage 6 extending throughout the length of the apparatus and the greater portion of the width of the apparatus, through which the felt 14 is passed while it is being subjected to heat treatment and stabilizaion, idler rolls 7, 8 and 9 being shown at the ends and an intermediate portion of the apparatus. A roll 10 on a shaft 11 is located at the left hand end of the apparatus, and a similar roll 12 on shaft 13 is located at the other end of the apparatus, these rolls being so located that the felt can be passed from one roll to the other and back again through the central longitudinal chamber or passage 6 of the apparatus.

Figure 9:
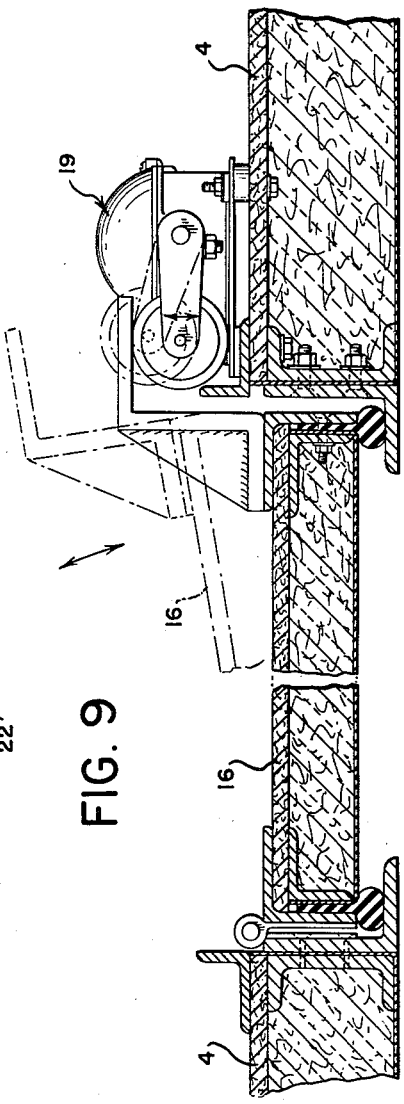
FIG. 9 is an enlarged horizontal sectional view on the line 9—9 of FIG. 4.

The apparatus is provided with a number of doors to permit access to the apparatus, doors 15 being located at the front end of the apparatus, doors 16 at the rear end of the apparatus (shown in FIGS. 4 and 9) and access doors 17 in the sides of the apparatus, these doors 15, 16 having windows 18 therein and having a safety switch 19 thereon which will shut off the machine when a door is opened.

Figure 6:
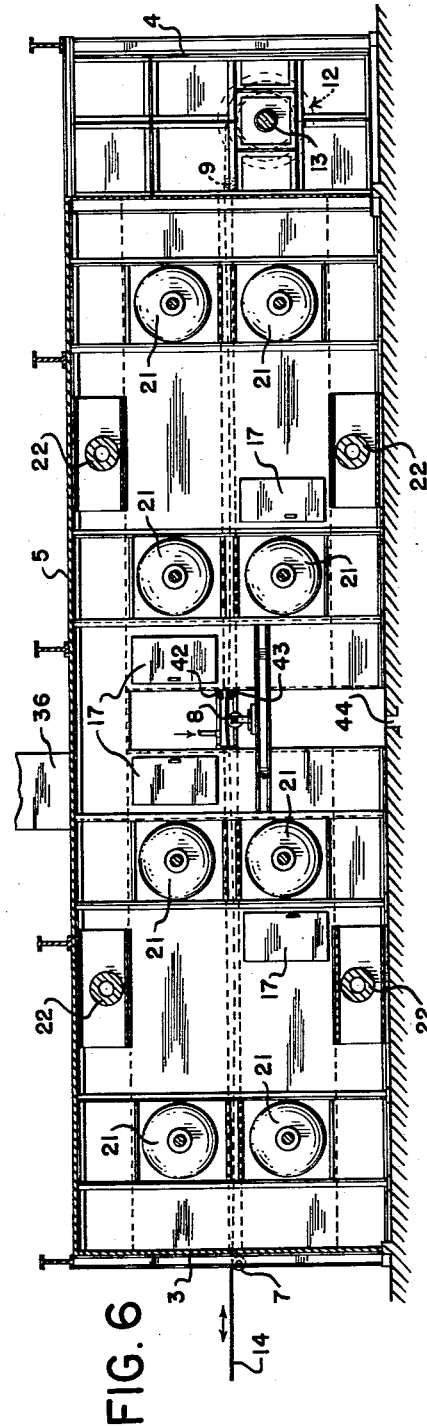
FIG. 6 is a longitudinal section on the line 6—6 of FIG. 1.
Figure 21:
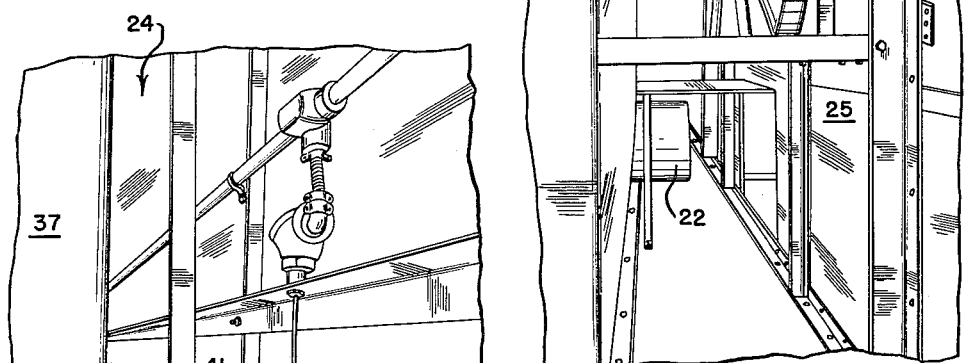
FIG. 21 is an enlarged perspective view of a portion of the apparatus showing the circulating fans and burners.

On each side of the apparatus there are a number of electric motors 20, 8 on each side (FIG. 2) which operate circulating fans 20a (FIGS. 5 and 7) which in turn are secured in housings 21 (FIGS. 6 and 21).

Figure 2:
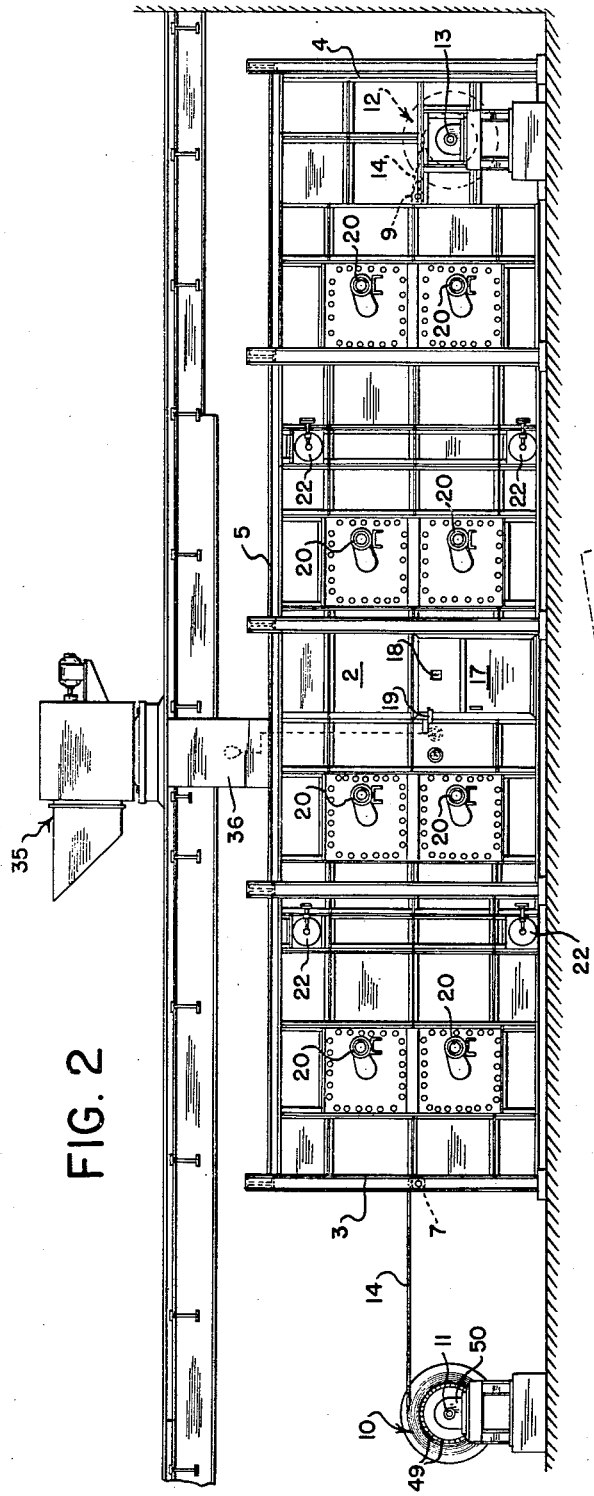
FIG. 2 is a side elevation of the apparatus with parts in section on the line 2—2 of FIG. 1.

On each side of the apparatus, and near the tops and bottoms thereof, are arranged burners 22, 4 on each side (FIGS. 2, 5 and 8).

Figure 7:
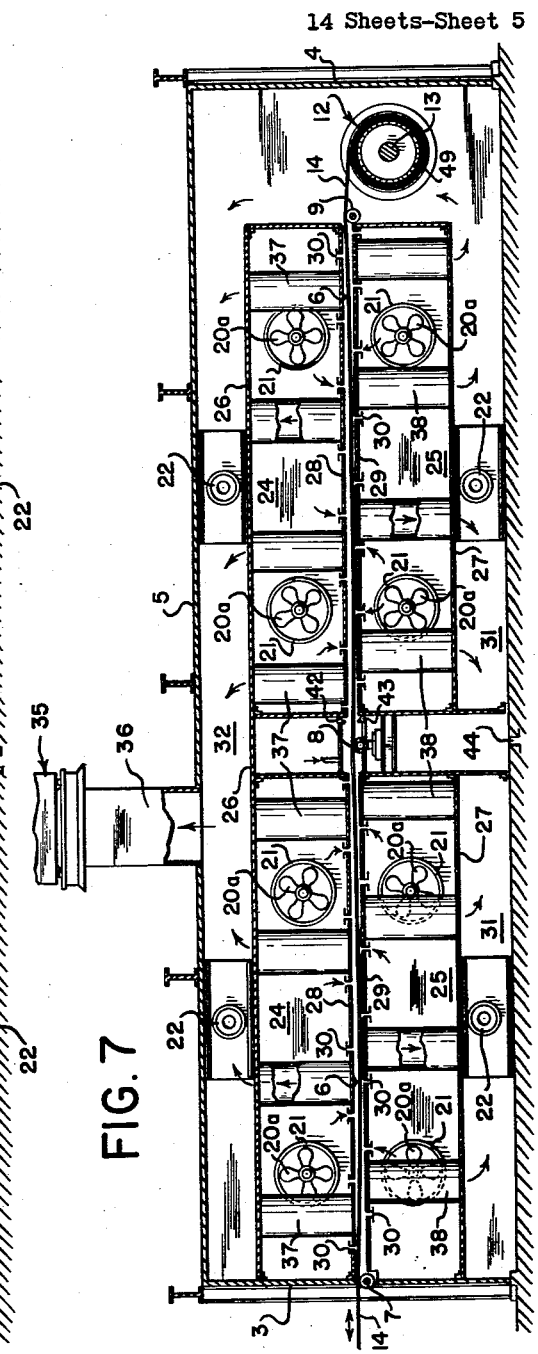
FIG. 7 is a longitudinal section on the line 7—7 of FIG. 1.

The apparatus above and below the central longitudinal chamber 6 is divided into compartments, 4 compartments 24 being arranged above the central passage, and 4 compartments 25 below the central passage, 2 of each (24, 25) on each side of a central partition (FIGS. 7 and 8).

The tops of the upper compartments are indicated at 26, and the bottoms of the lower compartments are indicated at 27. The bottoms 28 of the top compartments form the top of the central chamber 6, and the tops 29 of the bottom compartments form the bottom of the central chamber 6. A number of transverse slots 30 are arranged in the bottom 28 of the upper compartments and the top 29 of the lower compartments for supplying hot products of combustion to the felt as it passes through the chamber 6.

From FIG. 7 it will be seen that the slots 30 are staggered so that the hot gases are forced against and through the felt first from above and then from below, thus insuring a uniform and thorough heating of the felt throughout its thickness.

Located below the series of lower compartments is a passageway 31, in the sides of which the burners are mounted, and above the upper compartments is the passageway 32 in which burners are also mounted. Side passages 33 and 34 are arranged at the sides of the upper and lower compartments and are connected with the lower and upper passageways 31 and 32. Located above the upper passageway 32 is an exhaust fan 35 connected therewith through the duct 36.

Figure 23:
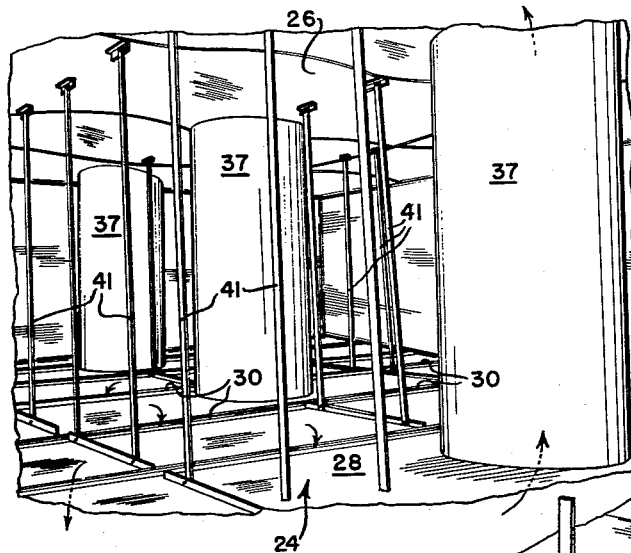
FIG. 23 is a perspective view of the interior of one of the upper compartments and the arrangement of the supports and air ducts therein.
Figure 24:
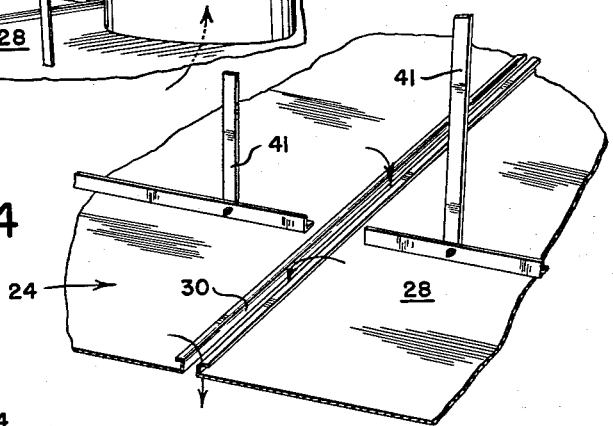
FIG. 24 is an enlarged fragmentary view of a portion of the bottom of one of the upper sections showing one of the air slots therein.

Extending through the upper compartments 24 is a series of vertical return air ducts 37, extending from the middle felt chamber 6 to the upper passageway 32, and similar vertical ducts 38 extend vertically through the lower compartments from the central felt passage 6 to te lower passageway 31. Supports 39 are arranged in the lower passageway 31 to support the bottom 27 of the lower compartments, and supports 40 are arranged in the top passageway 32 for supporting the top 26 of the upper compartments. Inside supports 41 are arranged inside the compartments 24 and 25 (FIGS. 23 and 24).

Figure 19:
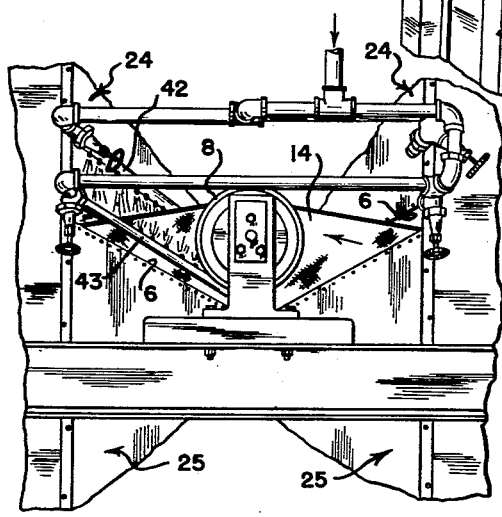
FIG. 19 is an enlarged view in perspective showing the apparatus for spraying the felt with water at the intermediate section of the apparatus.
Figure 14:
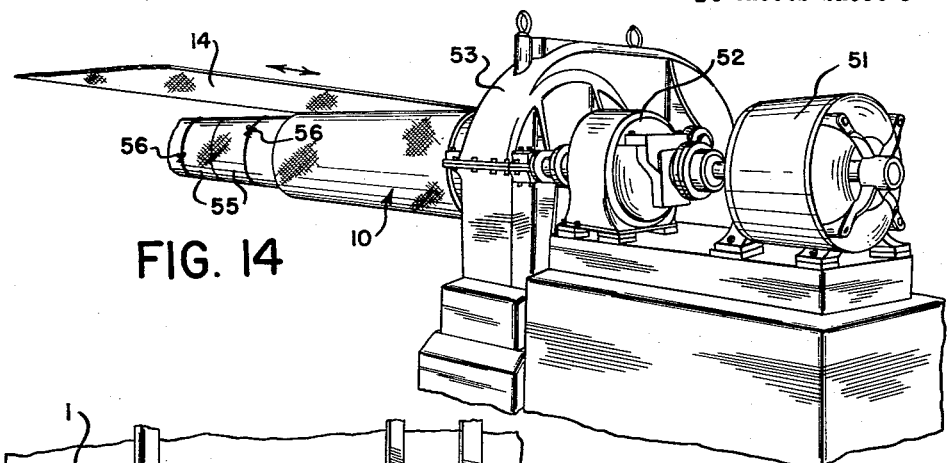
FIG. 14 is a perspective view showing the drive mechanism for one of the rolls having the felt wound thereon.

At a central portion of the apparatus, as shown diagrammatically in FIGS. 6 and 7 and in more detail in FIG. 19, are spray pipes 42 and 43 located above and below the felt passing through the chamber 6 and supplied with water from a water supply pipe having manually controlled valves therein. A drain pipe 44 (FIG. 6) leads from the bottom of the apparatus for draining away the water supplied by the central supply pipe. Openings 46 in the bottom compartments permit the draining of condensation from these compartments to the lower chamber.

Figure 18:
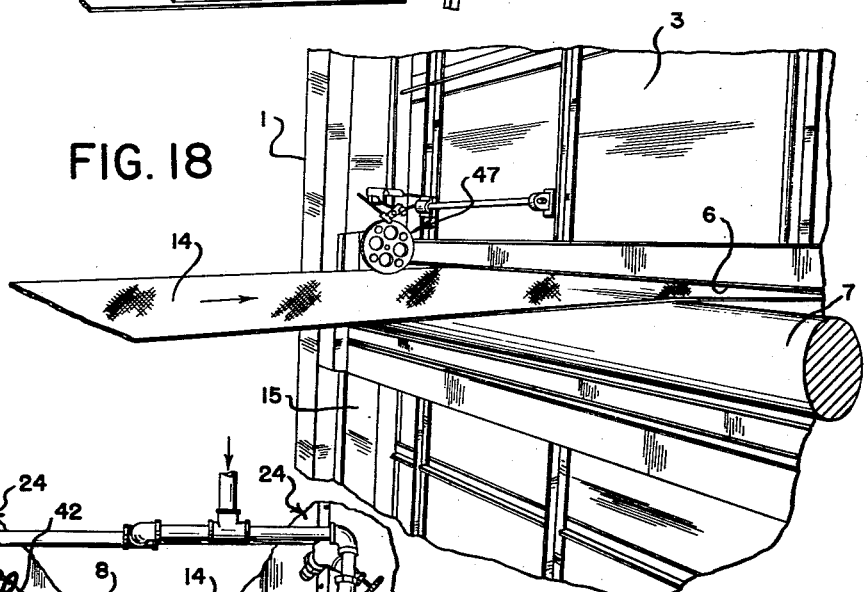
FIG. 18 shows part of one end of the apparatus in perspective with the felt entering and with the electronic counter for recording the travel and speed of the felt.
Figure 16:
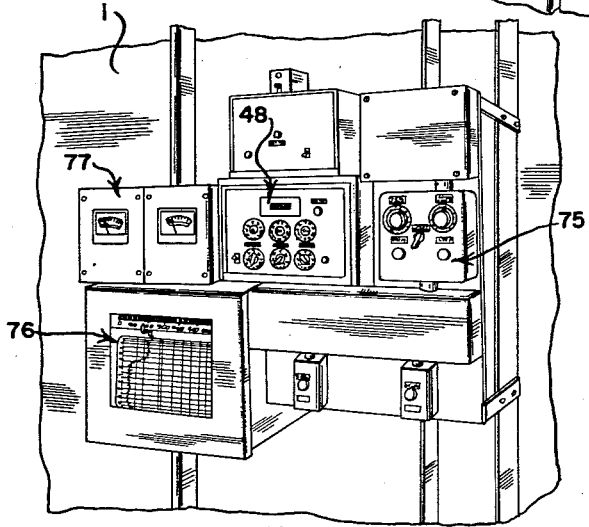
FIG. 16 is a conventional illustration of the control panel for the apparatus.

An electronic yardage counter and speed recording device 47 is shown in FIG. 18 connected (by means not shown) to the panel board recorder at 48 (FIG. 16).

The shaft 11 for the roll 10 and the shaft 13 for the roll 12 are mounted in bearings 50, and these shafts are driven each by a motor 51 through a variable speed coupling 52 and a 300-to-1 speed reducer 53 connected through the output shaft of the speed reducer to the shafts 11 and 13. The speed reducer is shown conventionally, and the variable speed or Dynamatic couplings are also shown conventionally, the purpose of this arrangement being to enable constant speed and constant tension to be applied and for increasing and decreasing the tension as required. Such variable speed couplings or Dynamatic couplings are illustrated by U.S. Patent No. Re. 22,432 and U.S. Patents Nos. 2,277,284, 2,353,107, and 2,458,454.

With a 300-to-1 reduction gear connecting the variable speed coupling with the rolls carrying the felt and with the driving of these variable speed couplings, e.g., by a 40-horse power motor, it is possible to apply heavy tension to the felts on the rolls and to control this tension and the speed of the rolls during the operation of the apparatus. Such variable speed couplings are manufactured, e.g. by the Dynamatic Division of the Eaton Manufacturing Company, of Kenosha, Wisconsin.

Figure 15:
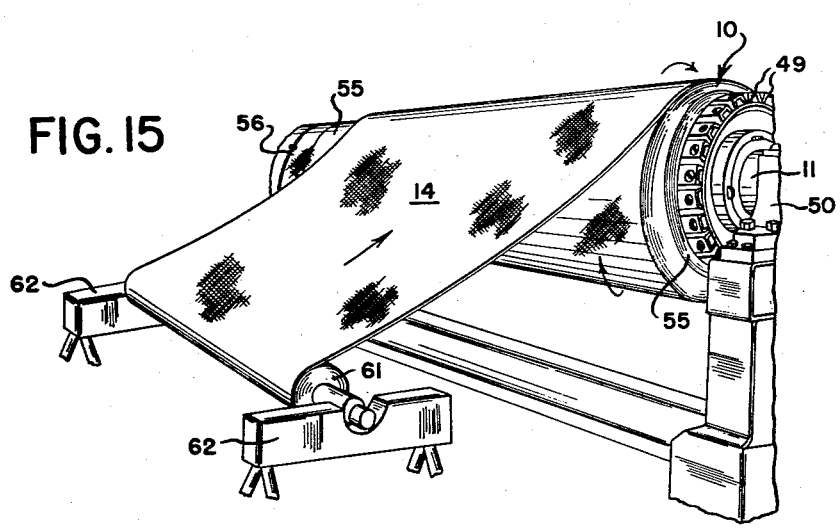
FIG. 15 shows the transfer of the felt from a supply roll to one of the rolls of the apparatus.
Figure 12:
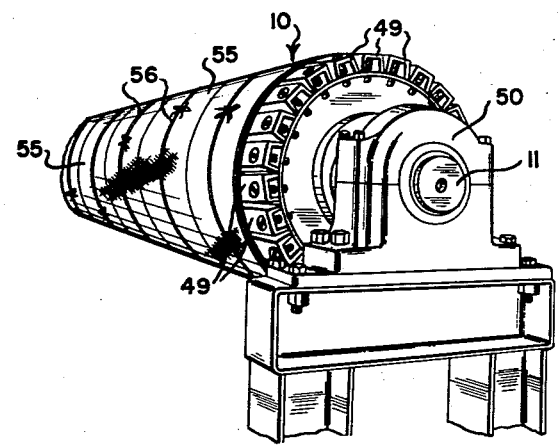
FIG. 12 shows in end perspective part of one of the rolls with the aprons thereon to which the felts are to be attached.
Figure 17:
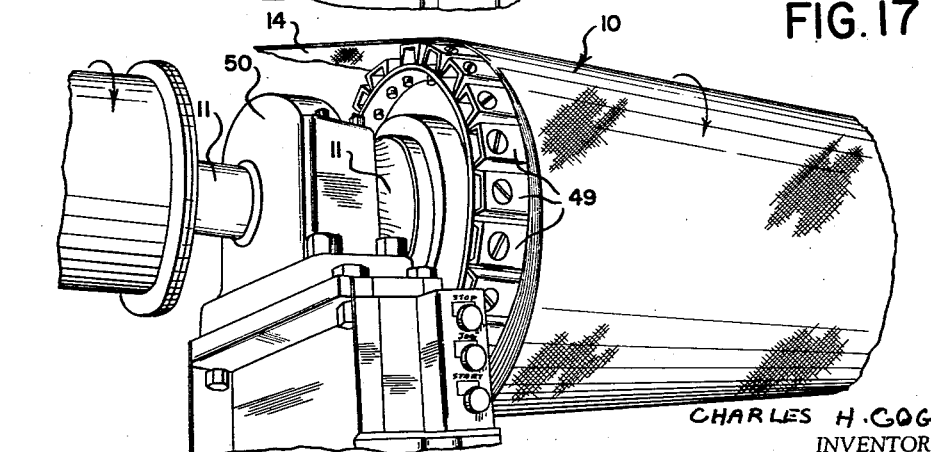
FIG. 17 is a perspective view showing one end of one of the rolls with its control panel.
Figure 20:
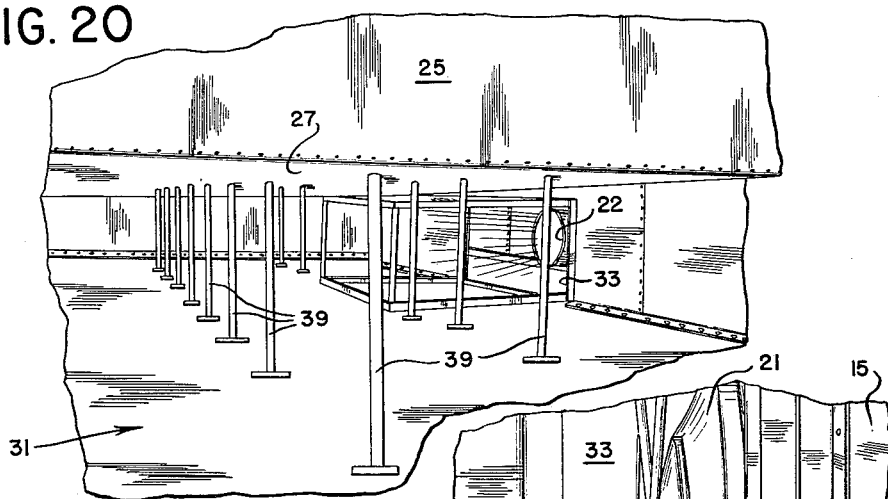
FIG. 20 is a perspective of a portion of the inside of one of the lower passageways showing the supports of the lower compartments.

The rolls 10 and 12, as shown in FIGS. 12, 15 and 17, are rigidly constructed with a number of inverted U-shaped members 49 secured to end discs carried by the shafts and one or more intermediate discs (not shown) are arranged between the U-shaped members and the shafts at intermediate portions of the rolls. This construction and arrangement is such that, even though the driving of the rolls is through one end thereof, a substantially uniform tension will be applied throughout the length of the roll to the felt being wound or unwound thereon.

Each of the felt carrying rolls has mounted thereon aprons 55 held in place by ropes 56 (FIG. 12) when not in use. A number of aprons of narrow width are thus mounted on the rolls to provide for securing thereto felts of varying widths. The number of apron sections will be used which is necessary to secure them to the end of the felt, while other sections of the apron which are not required, are left wound on the roll and held thereon by the ropes 56. The length of these aprons is greater than the length of the machine through which the felts pass, so that the aprons from one roll can be pulled through the machine to insure that the felt will have complete passage through the machine.

Figure 11:
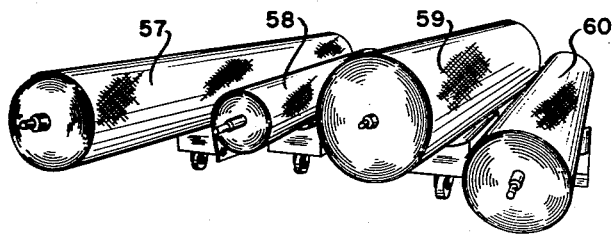
FIG. 11 shows in perspective rolls of felt as received from the weaving department.

The felts which are supplied to the apparatus for treatment are illustrated conventionally at 57, 58, 59 and 60 (FIG. 11) as they come from the looms. These felts vary in length and width, depending on the paper machine on which they are to be used.

Figure 13:
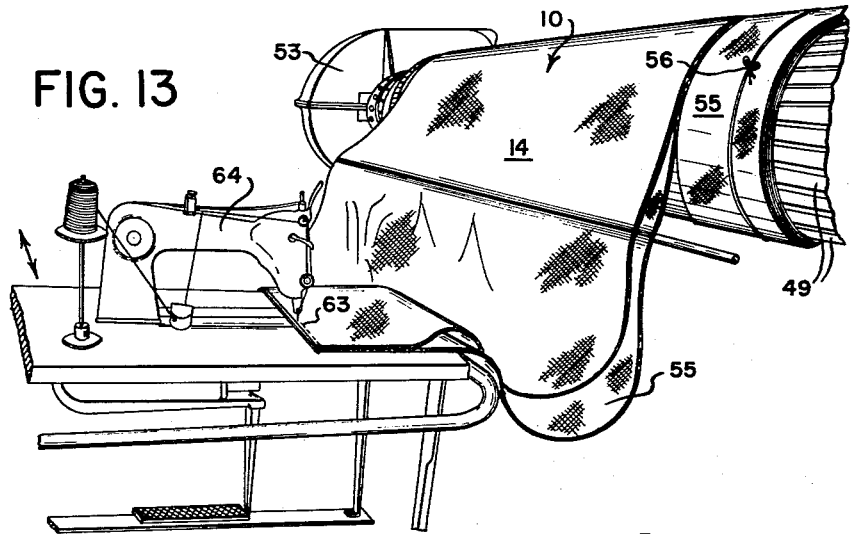
FIG. 13 illustrates conventionally and in perspective the securing of the end of the felt to the aprons.

The transfer of the felt from one of the supply rolls to one of the rolls of the machine is illustrated in FIG. 15, the roll 61 being mounted in supports 62 while it is being unrolled from the supply roll onto the roll of the apparatus. The stitching of the aprons to one end of the felts is illustrated conventionally in FIG. 13, the necessary number of rows of stitching 63 being used and applied by a sewing machine 64.

Figure 25:
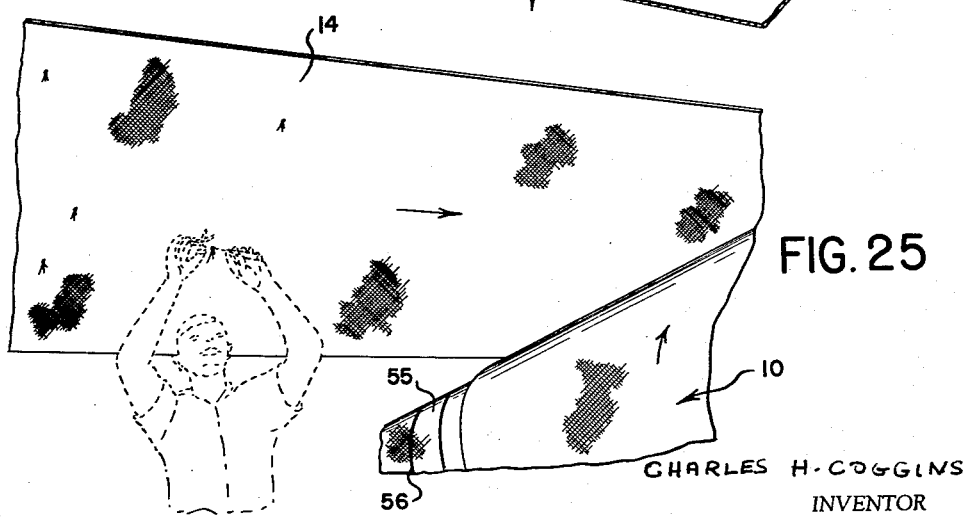
FIG. 25 shows the inspection of the felt.

The felt can readily be tested for imperfections by examining it while passing through the apparatus, as illustrated in FIG. 25, before it passes onto the end roll of the apparatus.

Figure 26:
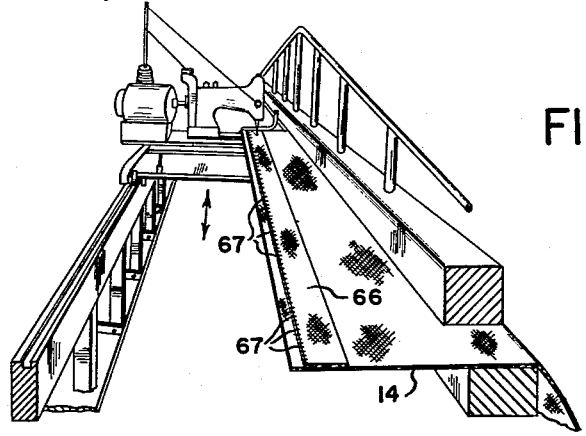
FIG. 26 shows an arrangement for securing a suitable webbing to one end of the felt to form a clipper seam.

After the felt has been heat stabilized and prepared for use, it is provided with means for securing the ends of the felt together on the paper machine by clipper seams. An advantageous method of doing this is illustrated in FIGS. 26 and 27 by using an added layer of webbing 66 extending crosswise of the felt at its end to which the metal loop connections 67 are secured, this added webbing being stitched to the end of the felt by threads as illustrated in FIG. 26, and to the other end of the roll of felt as illustrated in FIG. 27.

Figure 27:
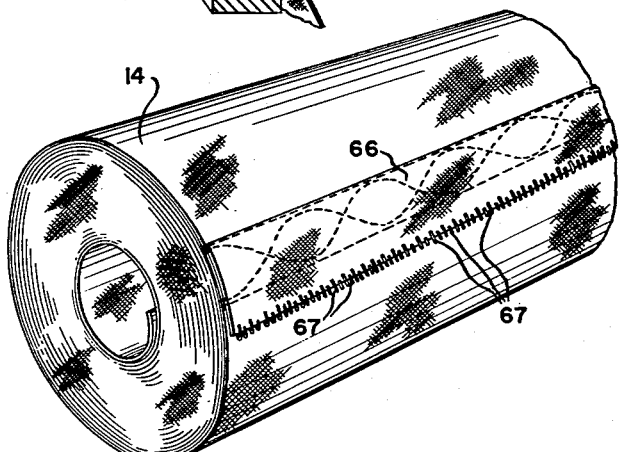
FIG. 27 shows a roll of finished felt with the webbing secured thereto to form a clipper seam for joining this end with the other end of the felt.

The stitching of the strip 66 to the end of the felt is indicated by the wavy dotted lines in FIG. 27. The strip 66 extends beyond the end of the felt at one end, as illustrated in FIG. 27 but is set back from the other end of the felt as shown in FIG. 26. When the ends of the felt are joined together through the metal loop connection 67, the portion of the strip 66 of FIG. 27 which extends beyond the end of the felt, will overlap the end of the felt shown in FIG. 26 which extends beyond the strip 66.

These added layers of webbing secured to the ends of the felt may vary in their construction and in some cases may advantageously be stabilized by passage through the machine before use under similar conditions to those used in stabilizing the felt to which they are secured. In the case of an all-cotton dryer felt, the webbing may be of all cotton or of modified construction, such as webbing made with nylon filled cotton warp yarns. A finished roll of felt with one of the end layers of webbing stitched thereto and having metal loop connections for securing to the other end of the felt is illustrated in FIG. 27.

Figure 28:
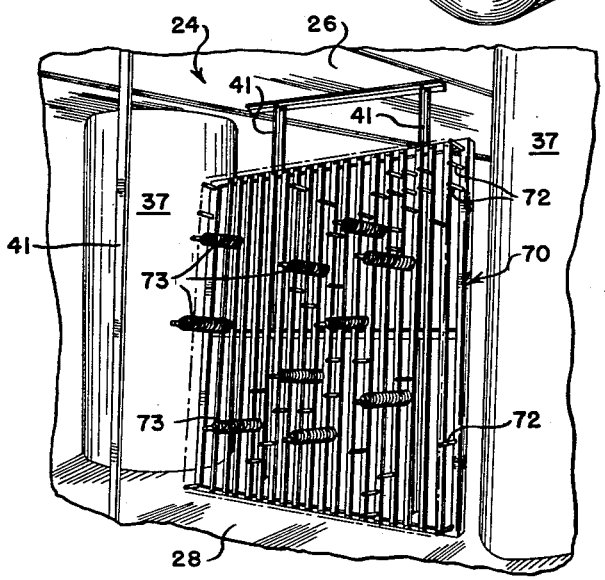
FIG. 28 shows in perspective a rack for supporting a number of spindles of yarn in one of the sections of the apparatus.

The apparatus, because of its provision for heating by hot gases at regulated temperatures, can be used for the heat stabilization of yarn on bobbins where this is desired, for example, where the yarns which are to be used in weaving a dryer felt are to be heat stabilized before use. In this case, one or more of the upper or lower chambers through which hot gases are circulated can be used for carrying out this heat stabilizing treatment. This is illustrated in FIG. 28, which shows an arrangement for supporting a large number of bobbins of filling yarn in the apparatus during their heat stabilization. The apparatus illustrated includes a rack 70 held in an inclined upright position by supports 41 in one of the top or bottom chambers of the apparatus through which the hot gases are circulated. The rack 70 has a large number of pins 72 thereon for supporting bobbins 73 of the filling yarn. A large number of bobbins can be thus supported in the apparatus and subjected to heat stabilization, and the bobbins so heat stabilized can then be used in the looms for supplying the filling yarns during the weaving of the fabric.

A control panel is shown conventionally in FIG. 16 including recording devices 75 for recording the speed and tension of the felt as measured by the current applied to the motor, a thermocouple recording station 76 for recording the thermocouple readings at the various parts of the apparatus, a station 77 for recording the operation of the variable speed coupling, and a station 48 for recording the yardage and speed. The connections and operation of the devices connected to the control station are not illustrated, and the control station is merely shown to indicate that proper devices are provided for indicating the temperature, speed, tension, etc. of the apparatus during operation.

From the foregoing description, it will be seen that the heavy felt to be heat stabilized is secured at its ends to aprons carried by the rolls at the ends of the apparatus and with the aprons of sufficient length so that the entire length of the felt between them can be passed completely through the apparatus from one end to the other in both directions.

Heat is supplied to the apparatus through the burners connected to the upper and lower compartments. The circulating fans circulate the hot air and products of combustion through each of the upper and lower chambers located above and below the central passage 6 through which the felt passes. The blowers force the hot gases through the slots in the bottom of the upper compartments and in the top of the lower compartments onto and through the felt at a number of different and successive positions in each of the chambers as the felt passes therethrough, so that the hot gases are distributed uniformly crosswise against and through the felt on both the top and bottom sides, thus uniformly heating it. The gases then pass from the central chamber, through the vertical return air ducts 37 and 38, to the upper and lower chambers, where they admix with the fresh products of combustion and are recirculated. Fresh hot gases are supplied by the burners, and the exhaust fan draws the excess gases from the top of the apparatus.

Figure 22:
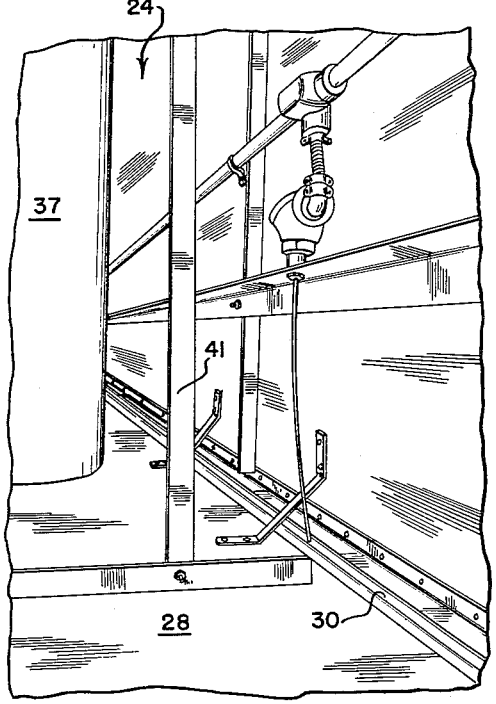
FIG. 22 is an enlarged view of a portion of the apparatus showing the thermocouple arrangement for control of temperature.

The temperature of the felt that is being passed through the apparatus is determined by a series of thermocouples, e.g., 12 in number, extending transversely across the width of the machine and spaced about e.g. 2½ feet, and with the thermocouples extending to a short distance from the surface of the felt. One such thermocouple is shown in FIG. 22. The recording of the thermocouple readings shows the temperature at short spaces across the width of the felt at any desired number of positions during the length of travel of the felt.

In the operation of the apparatus and the carrying out of the process, the dryer felt is secured at its ends to aprons on the rolls at the two ends of the apparatus, so that the entire length of the felt can be passed through the apparatus from one end to the other and back again.

The necessary tension is applied to the felt at one end by controlling the operation of the electric motor and of the Dynamatic coupling to insure that with the reducing gears used the necessary high tension can be applied to the roll on which the felt is being wound. This same arrangement of Dynamatic coupling enables the necessary tension to be applied to the roll from which the felt is being unwound, so as to maintain the felt during its passage through the machine under a controlled and regulated tension. Thus, when the felt is being pulled with the necessary tension by the roll on which it is being wound, similar tension is being applied to the other roll by means of the Dynamatic coupling. This coupling operates from a magnetic field which causes the reverse cylinder to let off with an even tension. These drives are so designed that the cloth will be held at a constant speed and tension as the cloth roll increases in diameter on one roll and decreases in diameter on the other.

The operation of the burners can be controlled by thermostats set at the temperature at which the apparatus is to operate. The speed and tension of the machine is controlled by a potentiometer and is read from two voltmeters located on the control panel. One meter measures the speed, and the other, the amount of volts supplied as indicating the tension applied through the variable speed coupling.

When the apparatus is to be used for the heat stabilization of yarns, such as filling yarns, in one or more of the chambers of the apparatus, the yarn is wound on bobbins, e.g., aluminum bobbins, and then placed in one or more compartments of the machine on a spindle rack as illustrated in FIG. 28. The temperature is then raised to the stabilizing temperature which, in some cases, may be the same as, and in other cases somewhat higher than, the temperature at which the felt is to be used as a dryer felt on a paper machine. The temperature can thus be raised, e.g. to 300° F. or 350° F. by using the burners connected with the chamber or chambers in which the spindles are placed. The gases are circulated by the fans, and the operation is continued for a sufficient period of time to secure the heat stabilization. When the yarn on the bobbins has been thus heat stabilized or heat set for a sufficient period of time, e.g., 2½ to 3 hours, in some cases, the machine is then cooled down and the bobbins are removed from the machine and can be used, e.g., as filling yarns, in the weaving process.

When the felt is brought to the machine for heat stabilization, the ends are sewn to the aprons on the rolls at the ends of the machine and the aprons are of sufficient length so that the entire length of the felt can be passed through the machine from one end to the other and back again.

The heating of the felt in the apparatus is accomplished by the operation of the burners and of the circulating fans and with control of the heat supplied by the burners to maintain the desired temperature of operation. The burners are controlled by thermostats, which can be set at various temperatures and which will operate control devices on the burners for increasing or decreasing the fuel supply to the burners to maintain the desired temperature in the recirculating gases. The control is advantageously accomplished by dividing the apparatus into zones and providing automatic thermostatic controlling devices for the burners in each zone to maintain the temperature within the zone within predetermined temperature limits, and with provision for changing the temperature and temperature limits by manual adjustment of the thermostatic controls. Heat can thus be advantageously controlled by the use of a Partlow temperature control, Model LP6KL, manufactured by the Partlow Corporation of New Hartford, New York, and referred to in Partlow Bulletin 306–I. (See also U.S. Patent No. 1,861,509.)

Figure 32:
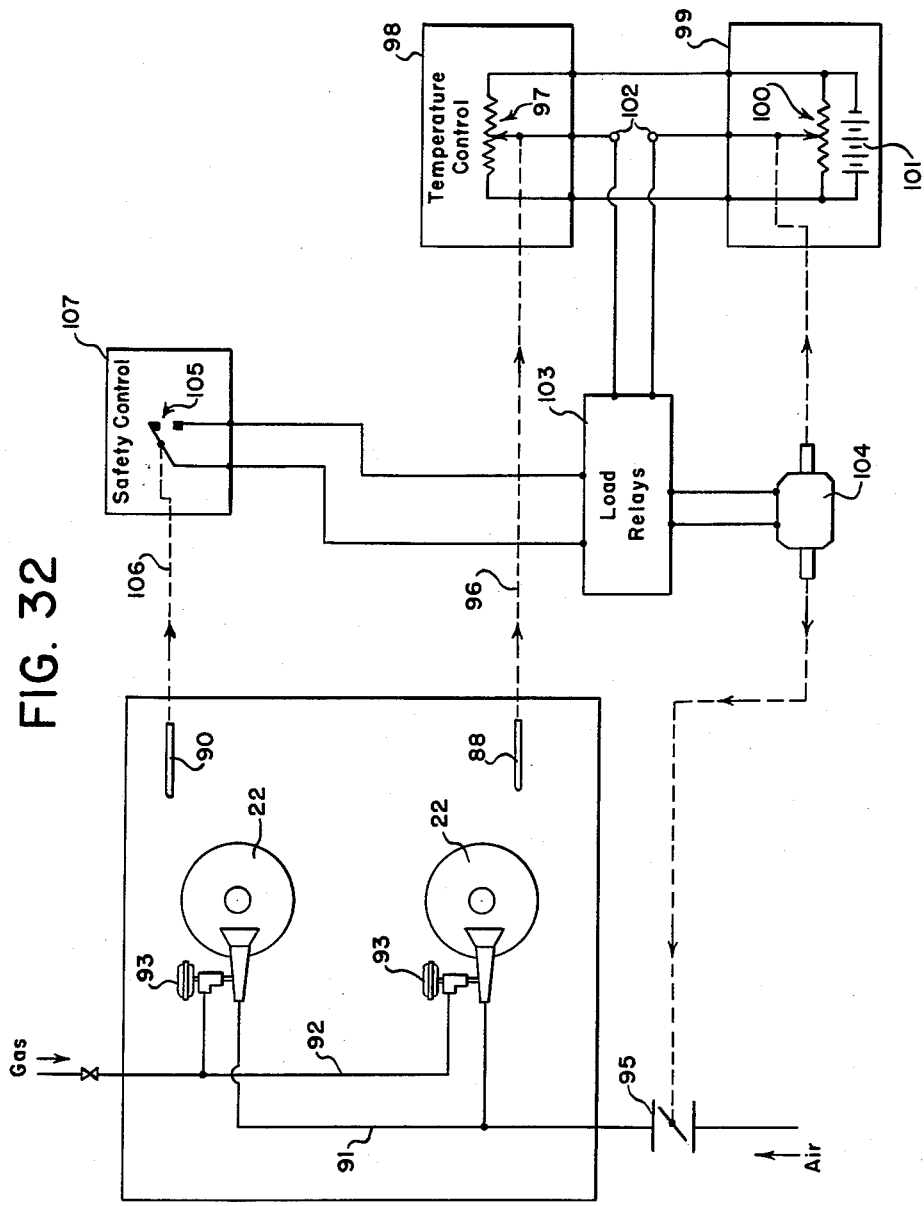
FIG. 32 is a diagrammatic showing of the temperature control system of the apparatus.

One form of automatic control of two of the burners in one zone is illustrated in a conventional and diagrammatic manner in FIG. 32, which also shows a thermostatically controlled safety arrangement for automatically cutting off the burners if a predetermined high temperature is reached. The Partlow temperature controls Model L15–4–8KL, are advantageously used for this latter purpose. The temperature control for the automatic operation of the apparatus can thus have a low temperature limit of e.g. 100° to 650° F., with provision for operating within any desired limiting range of temperatures up to that to which the felt is to be subjected during hat treatment. The high temperature control for cutting off the burners may have a wider range of e.g. 100° to 800° F. and can be set to cut off or cut down the burners when a predetermined high temperature is reached, to prevent the building up of high heat that might burn or scorch the felt. The Partlow temperature controls L15–4–8–KL that act as safety controls are referred to in Partlow Bulletin No. 303–I.

The apparatus illustrated has eight burners, 22, four on each side of the apparatus (FIG. 8) and arranged in pairs at the top and bottom of the apparatus (FIG. 2).

For purposes of control, four different zones with four different thermostatically controlled temperature devices are provided, one for each pair of burners. In FIG. 32, the control for one pair of burners 22 is illustrated, and the same control is provided for the other three zones.

The burners shown are gas burners supplied with natural gas, and are zero pressure velocity burners, such as manufactured by the Surface Combustion Corporation. As illustrated conventionally in FIG. 8, the burners have an air supply line 91 for supplying air under regulated flow and pressure, a gas supply line 92 for supplying gas under pressure, and a regulator 93 controlled by the air supply and which in turn controls the gas supply. In this type of burner, the velocity and pressure of the air flow through the pipe 91 controls the position of the diaphragm in the regulator 93, which, in turn, regulates the gas flow into the burner. The regulation of the air flow through the pipe 91, therefore, is employed to regulate the gas input into the burners and, in turn, the heat supplied by the burners and the temperature within the apparatus.

As illustrated conventionally and diagrammatically in FIG. 32, this control is effected by means of an electrical feedback system starting with the thermostat or temperature sensitive element 88 and ending with a control valve 95 in the air supply line 91 and which regulates the air flow through this line. The element 88 is located inside the apparatus and in contact with the hot circulating gases so that it will be acted upon thereby. In the apparatus illustrated, the thermostat or temperature sensitive element 88 is shown as a mercury-filled bulb mechanically connected through a capillary tube 96 to the arm of a potentiometer 97 in a temperature control monitoring device 98, which can be set to operate at a predetermined temperature or within a predetermined temperature range, for example, a monitoring device such as that made by the Partlow Corporation Model LP6KLP–212.

The position of the arm of potentiometer 97 is changed by the expansion or contraction of the temperature sensitive mercury in the tube 96 in a direction which depends on the direction of the temperature change. The control system then produces an electrical voltage output proportional to the change in the position of the arm of potentiometer 97. This is effected by means of a proportional network 99 having a potentiometer 100 across which is connected a battery 101 and the resistive element of potentiometer 97. When the position of the arms of potentiometers 97 and 100 are electrically identical so as to tap off the same voltage there is no voltage output across the terminals 102. However a change in the position of arm 97 due to a temperature change sensed at element 88 moves the arm of potentiometer 97 and upsets the balance. A voltage is therefore produced across terminals 102, the value of which is proportional to the change in temperature in the furnace, and the polarity of which is indicative of the direction of the temperature change.

The voltage across terminals 102 is then applied to load relays 103 which are adapted to apply input power to a proportional motor 104. The proportional motor is mechanically linked to drive the valve 95. In addition the motor is mechanically linked to drive the arm of potentiometer 100. Since the direction of rotation of the motor is dependent on the polarity of the voltage 102 this permits the motor to be linked to potentiometer 100 so as to change the position of its arm in a direction which cancels the voltage developed across terminals 102. In this way the angle of motor rotation is made proportional to the voltage developed across terminals 102. The angle of rotation of valve 95 is therefore also made proportional to the voltage 102 and the direction of its rotation dependent on the polarity of the voltage. The feedback system is thus completed by linking the motor to rotate the valve 95 so as to counteract the temperature change causing its rotation.

A safety control is also included within the control system of the invention in order to prevent the build up of a high heat that might burn or scorch the felt in the event of failure of the constant temperature control. This system employs a mercury-filled temperature sensitive element 90 which is advantageously positioned within and near the top of the apparatus, and in contact with the hot recirculating gases. The element 90 is mechanically connected, through a capillary tube 106 to a switch 105 in a safety control device 107, such as the control device made by the Partlow Corporation Model L–15–14–8KLP. The switch 105 is normally open and is set to be closed only when the expansion of the mercury in the tube 106 signals that the temperature has reached the preselected maximum value. The switch then connects power through the load relay 103 to rotate the motor 104 in a direction which closes the valve 95 to shut off the burner.

In the operation of the apparatus and the carrying out of the process, the use of the burners and their automatic control can be set to give a substantially uniform temperature, e.g., of around 300° F., and the automatic controls will maintain the temperature within a range of e.g. 5°. By setting the automatic control at successively different temperatures, it is possible to heat the felt progressively, during successive passes through the apparatus, to successively higher temperatures, or at successively higher and lower temperatures, depending upon the heat treatment desired for the particular fabric being treated, and depending in some cases on the moisture content of the fabric while it is being passed through the apparatus under tension and while it is being dried and stabilized.

The rate of circulation of the hot gases through the apparatus is many times that of the supply of hot gases by the burners, so that the same gases are repeatedly recirculated with the addition of fresh gases from the burners and with the removal of the excess gas as exhaust up the stack at the top of the apparatus. The gases may be recirculated for example, at a rate 10 times that at which fresh hot gases are supplied and admixed therewith and surplus exhaust gases are removed from the apparatus. The rate of recirculation is controlled by controlling the operation of the circulating fans, which can be set to give the desired rate of circulation.

The use of the apparatus and the carrying out of the process will be further illustrated by the following specific example, in which an all-cotton dryer felt, of a weight of about 59 ounces per square yard dry, and woven with core warp cotton yarns, is subjected to stretching and stabilization. For a felt which, in its stretched and stabilized condition, is about 146 inches in width and 100 yards long, the dryer felt is woven to a width of about 150 inches and a length is cut of about 97 yards.

The felt is secured at each end to sections of the aprons on the end rolls. The felt is then first passed in the forward direction through the apparatus at a tension of around 4000 pounds, and water is applied to the felt through the top and bottom spray pipes located in the central portion of the apparatus. The felt is next passed through the apparatus in the reverse direction under a similar tension and with further spraying of the felt with water to insure thorough wetting and saturation. The tension applied to the felt results in reducing its width to e.g. around 147 inches or about 2% and an increase in length of e.g. about 2½ yards or somewhat less, or an increase of about 2½% in length.

By observing the felt while traveling in the reverse direction, the machine operator can readily determine, by visual appearance of the felt, whether or not it has been thoroughly saturated. If the felt is not thoroughly wet during two passages of the apparatus, it is passed through the apparatus again and water is again applied, and this is continued until the saturation point is reached.

The felt is now rolled on the reverse roll, and the thermostat for the automatic temperature control is set to control the burners to maintain the temperature at about 300° F. The burners and circulating fans are turned on to raise the temperature to 300° F. As the temperature is rising, it is being recorded from the thermocouples located in the apparatus at various positions and which are connected to the recording device, where the temperature is recorded. When the temperature reaches 300° F., the felt is then passed in the forward position and with a tension applied of around 7300 pounds. At this point, the felt is carefully measured to insure obtaining the desired width in the stabilized felt, e.g. 146 inches. The tension applied is sufficient to increase the length of the felt somewhat and reduce its width to that desired, the length increasing e.g. by around 4½ yards or somewhat more. The felt is then passed in the reverse direction through the apparatus while maintaining the temperature at 300° F. and a similar tension of about 7300 pounds. At this point, the felt is about 50% dry. The temperature is then reduced by manually setting the automatic thermostatic control burners to maintain the temperature at 150° F. and the felt is then passed back and forth two or more times at a tension of around 4200 pounds in order to insure the completion of the drying of the felt. The reducing of the temperature avoids local overheating of the felt as it becomes dry. Ordinarily, the felt will be sufficiently dried after two such passages, but if it requires further drying it can be passed through the apparatus one or more additional times.

When the felt is on the last pass through the apparatus, the operator checks the amount of moisture in the felt at various places with a suitable test device such as an electronic moisture register.

The speed of the felt in its passage through the apparatus while it is being wet and stretched and dried is about 18 feet per minute.

When the felt is dried as above described, the temperature of the dried felt in the case of a cotton felt, is such that it can ordinarily be wound up on the roll without further cooling in the machine.

Where the felt is heated and stretched and dried at higher temperatures, up to e.g. 350° F., or higher, in the final passages of the felt through the apparatus, it can be then cooled by shutting off the burners and blowing air at ordinary temperatures through the apparatus while the felt is being passed one or more times through the apparatus to cool it before it is finally wound up on the roll.

With heavy industrial fabrics which do not require wetting before they are stretched and stabilized, the spraying of the fabric with water, as illustrated in the above example, can be omitted. So also, the fabrics, whether treated without wetting or with wetting, can be heated to successively higher temperatures during each successive pass through the apparatus by manually adjusting the automatic thermostatic controls to successively higher temperatures, e.g. 150°, 200°, 250°, 300°, 350°, 350°, or 400°. The temperature, in any event should be kept below that which will injure the fabric during its heating and stretching and stabilizing treatment.

In the above example and with a cotton felt having cotton core warp yarns, the stretching of the fabric is limited, e.g., to about 4% or 5%. With cotton felts which do not have core yarns, but which are of conventional weave, they will ordinarily be stretched to a greater extent, e.g., up to around 10% or more in length, and with a somewhat greater decrease in width than that of the above example.

Instead of using an all-cotton dryer felt, as in the above example, other dryer felts can be used, made of cotton and synthetic fibers or in part of cotton and in part of synthetic fibers, or in part of cotton-asbestos yarns, etc.

Figure 29:
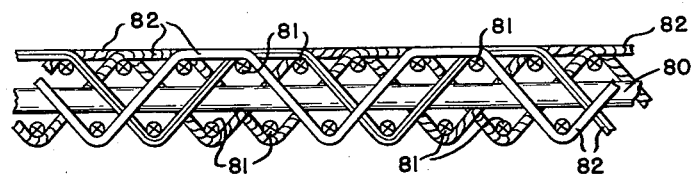
FIGS. 29 and 30 show an advantageous structure of the felt when woven with core warp yarns.
Figure 30:
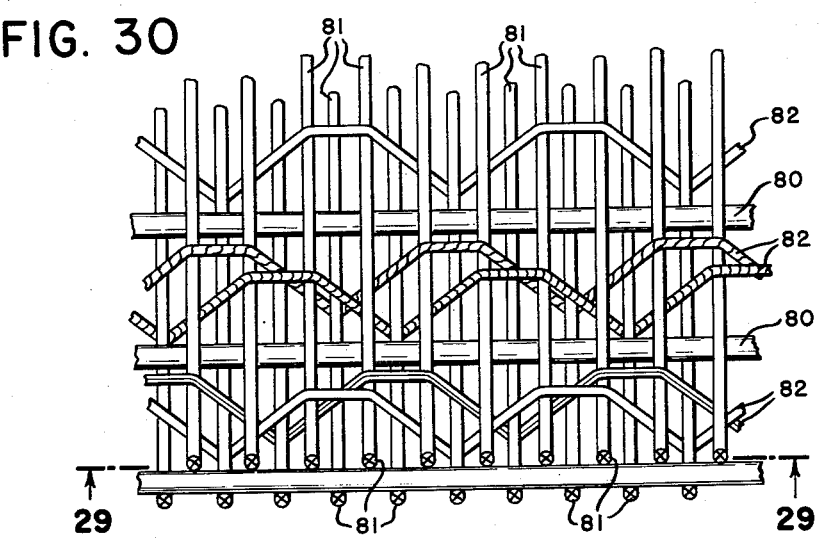

An advantageous form of weave of cotton dryer felts and other felts is illustrated in FIGS. 29 and 30, the weave being somewhat exaggerated in the drawing for purposes of illustration. In the fabric thus illustrated, the central core warp yarns 80, which carry the main load when the felt is subjected to tension, are parallel and practically without crimp. The warp yarns 82 vary in their weave on the inner and outer surfaces of the felt. On the inner surface, the warp yarns 82 extend over two filling yarns to give a flat, smooth surface. On the outer side of the felt, the warp yarns extend over a single filling yarn and give a rougher surface, which promotes the evaporation of water from the outside of the felt during use on the paper machine. In this type of structure, the tension applied to the felt is carried mainly by the warp core yarns.

Figure 31:
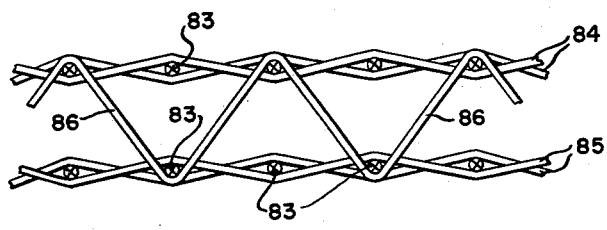
FIG. 31 shows an interwoven felt without the core warp yarns.

FIG. 31 shows a different type of weave, without core warp yarns. This figure also shows the weave expanded for purposes of illustration. The filling yarns 83 are interwoven with warp yarns 84 and 85 and the two layers are interwoven by warp yarns 86 to join the two layers together.

The improved apparatus and process of the present invention enable dryer felts and other heavy industrial fabrics to be stretched and heat stabilized in a particularly advantageous manner. The stabilizing of heavy dryer felts, for example, having a width of up to 25 feet and a length of e.g. 100 or more yards, presents a diffcult problem from the standpoint of obtaining uniform drying and heat stabilizing under the heavy pressure required. The apparatus of the present invention, and the process carried out therein, enable the necessary high tensions to be applied to the heavy felts and enable the felts to be thoroughly saturated with water where this is required, prior to the stretching and heat stabilization; and also enable the heat stabilization to be carried out by heating to a regulated and substantially constant temperature while the felts are held under high tension and with circulation of the hot gases against and through the felt on both sides and without at any time bringing the felt into contact with hot heated metal surfaces such as would tend to overheat the surface of the felt in contact therewith in order to insure sufficient heating of the interior portions of the felt.

The improved stabilized dryer felts of the present invention are dimensionally stable, both against lengthwise and crosswise stretching or shrinkage and also against puckering or wrinkling or distortion when used on paper machine dryers.

The entire felt, e.g., a cotton dryer felt, is stretched and stabilized while wet, and dried and stabilized under tension, and with substantially uniform treatment of the yarns of the felt throughout by the hot gases which are used to heat them and which are forced through the felt repeatedly from both sides, at a carefully controlled and uniform temperature, and without objectionable overheating or injury to any portion of the felt, and without unequal temperature action on the surface yarns as compared with the yarns inside the felt.

I claim:
1. An apparatus for pre-stretching and heat-stabilizing long lengths of wide heavy multiply dryer felt of the kind used under tension on a paper machine for picking up wet paper and passing it over hot drying cylinders where the paper is dried at temperatures ranging from 150° F., said apparatus including a long, wide, and generally rectangular structure having a central horizontal passage extending through the length of said structure and the greater portion of its width and said central passage being located between upper and lower horizontal chambers, spaced apart a sufficient distance to permit the heavy multiply fabric to pass therebetween, rolls at the ends of the structure arranged to permit the fabric wound on one roll to pass through said central passage and on to the other roll, in either direction, means for applying a heavy tension to the roll on to which the fabric is wound and a corresponding tension on the roll from which the fabric is unwound, in either direction, said tension applying means including reducing gears, means for heating the fabric while it is passing through said central passage, said means including a plurality of compartments both lengthwise and crosswise of said structure and both above and below said central horizontal passage, each of said compartments having a series of transverse slots for discharging hot gases downwardly from the compartments above said central passage and upwardly from the compartments below said central chamber and said slots being staggered so that the downwardly discharging slots alternate with the upwardly discharging slots, blowers for circulating the hot air through said compartments and for discharging it through said slots into the central passage, burners for supplying heating products of combustion to the gases so circulated, means for re-circulating said gases by said blowers, and automatic means for controlling the temperature of the hot gases to secure uniformity of temperature of the gases discharged from the different compartments through said alternating slots into the central passage.

2. The method of pre-stretching and heat-stabilizing longth lengths of heavy multiply dryer felt, of the kind used under tension on a paper machine to pick up the wet paper and pass it over hot drying cylinders where the paper is dried at temperatures in the range from around 150° F. to around 350° F., in order to produce a stabilized dryer felt which is stabilized against objectionable stretching and shrinkage, either longitudinally or crosswise, and against distortion when used on a paper machine, which comprises passing the heavy multiply felt under high tension through a long horizontal passage from one roll from which the felt is unwound to another roll on which it is wound, providing a series of hot gas circulating compartments above and below the felt, and discharging the hot gases therefrom transversely of the travel of the felt and against both sides of the traveling felt and with the discharge on opposite sides of the felt alternating with each other, circulating and re-circulating the hot gases in each of said separate compartments, burning gases to supply heat for the hot gases so circulated, applying water to said felt to effect thorough wetting of the same while the felt is under tension and passing through said chamber, and effecting the drying of the resulting wet felt while it is under high tension and with regulation of the hot gases from the different compartments to maintain substantially uniform heating of the felt during its passage through said chamber.

References Cited in the file of this patent

UNITED STATES PATENTS

Re 21,890    Walsh et al. _____ Aug. 26, 1941

(Other references on following page)

UNITED STATES PATENTS

| | | |
|---|---|---|
| 171,519 | Labounty | Dec. 28, 1875 |
| 891,914 | Cox | June 30, 1908 |
| 979,781 | May et al. | Dec. 27, 1910 |
| 1,137,719 | Sibson | Apr. 27, 1915 |
| 1,253,372 | Gotti | Jan. 15, 1918 |
| 1,458,342 | Huyck | June 12, 1923 |
| 1,514,748 | Wilson | Nov. 11, 1924 |
| 1,514,749 | Wilson | Nov. 11, 1924 |
| 2,165,772 | Walsh et al. | July 11, 1939 |
| 2,271,295 | Gates | Jan. 27, 1942 |
| 2,297,314 | Offen | Sept. 29, 1942 |
| 2,439,722 | Dreisel | Apr. 13, 1948 |
| 2,518,740 | Albright | Aug. 15, 1950 |
| 2,640,277 | Dungler | June 2, 1953 |
| 2,807,096 | Kullgren et al. | Sept. 24, 1957 |

FOREIGN PATENTS

| | | |
|---|---|---|
| 500,691 | Belgium | Feb. 15, 1951 |
| 531,073 | Italy | July 21, 1955 |